United States Patent Office 3,346,613
Patented Oct. 10, 1967

3,346,613
2,4-DIHALOPHENYL ESTERS OF LOWER ALKANE- AND HALOALKANE-SULFONIC ACIDS
John E. Larson, Concord, and Jerome G. Kuderna, Jr., Modesto, Calif., assignors to Shell Oil Company, New York, N.Y., a corporation of Delaware
No Drawing. Filed July 29, 1965, Ser. No. 475,862
7 Claims. (Cl. 260—456)

This application is a continuation-in-part of Serial No. 156,485, filed December 1, 1961 and Serial No. 277,728, filed May 3, 1963 and now U.S. Patent 3,228,827; Serial No. 277,728 being a continuation-in-part of Serial No. 156,485, now abandoned.

This invention relates to a novel class of aromatic esters of alkane sulfonic acids. In particular the invention relates to dihalophenyl alkanesulfonates and their use as nematocides.

Applicants' parent applications are drawn to the discovery that 2,4-dihalophenyl esters of lower alkane- and haloalkane-sulfonic acids are highly effective residual nematocides.

It now has been discovered that within this class of esters, the subclass wherein the two halogen atoms bonded to the phenyl group are not the same differ in one vital respect from those members of the class wherein both of the halogen atoms are the same. When seeds are treated with one or more members of this particular class—as by soaking the seeds in a solution of the ester(s)—the plants which issue from the seeds are protected against attack by nematodes, whereas the other members of the class do not have this property. Further, in addition to being nonphytotoxic to the seeds, and germinating and growing plants, these esters are essentially nonphytotoxic to the roots of growing plants. Thus, they can be used in a variety of ways to protect plants from attack by nematodes: they can be used conventionally as residual nematocides—being applied pre-planting, at planting, or post-planting—they can be used as dip nematocides—roots of plants being dipped into liquid formulations thereof to destroy nematodes on the roots and also to provide residual protection—and they can be used to treat seed.

The fact that the entire class of esters are effective residual nematocides sets them apart—insofar as applicants are aware, few if any other effective residual nematocides are known. Their lack of phytotoxicity makes them even more unique, for few effective nematocides, even of general usage, are nonphytotoxic. The further fact that they can be used to protect plants by treating the seed is believed to make them wholly unique, for insofar as applicants are aware, no other compounds having this property are known.

This class of dihalophenyl alkanesulfonates has been found to be outstandingly effective seed treatment nematocides. Seeds treated prior to planting with these compounds will protect the root system of the growing plant for prolonged periods of time. This method of protecting plants from nematode attack is of great practical significance in that it provides an inexpensive and agronomically advantageous means of nematode control heretofore not possible. Seed treatment offers a promising means of nematode control for many low value crops. In addition it provides a means of nematode control which does not require specialized techniques of application, expensive equipment or much manpower. This labor-saving method of nematode control offers a practical control means for most annual crops.

The 2,4-dihalophenyl sulfonates of the invention are characterized by the formula:

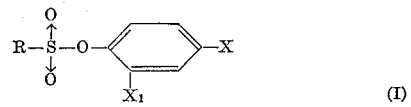
(I)

wherein X and $X_1$ are each different halogens and R is alkyl or monohaloalkyl of one to four carbon atoms. When R is haloalkyl, it is preferred that the halogen be middle halogen—that is, chlorine or bromine. X and $X_1$ may be selected from chlorine, bromine, fluorine or iodine. Typical of these mixed 2,4-dihalophenyl alkanesulfonates are:

2-chloro-4-bromophenyl methanesulfonate
2-bromo-4-chlorophenyl methanesulfonate
2-bromo-4-chlorophenyl chloromethanesulfonate
2-bromo-4-chlorophenyl bromomethanesulfonate
2-fluoro-4-bromophenyl methanesulfonate
2-fluoro-4-bromophenyl chloromethanesulfonate
2-fluoro-4-chlorophenyl methanesulfonate
2-iodo-4-bromophenyl methanesulfonate
2-iodo-4-chlorophenyl methanesulfonate
2-chloro-4-bromophenyl ethanesulfonate
2-chloro-4-bromophenyl chloroethanesulfonate
2-bromo-4-fluorophenyl ethanesulfonate
2-fluoro-4-iodophenyl ethanesulfonate
2-chloro-4-bromophenyl propanesulfonate
2-iodo-4-chlorophenyl propanesulfonate
2-bromo-4-iodophenyl propanesulfonate
2-chloro-4-bromophenyl butanesulfonate
2-fluoro-4-chlorophenyl butanesulfonate
2-iodo-4-chlorophenyl butanesulfonate The compounds of the invention wherein R is methyl are preferred because they are particularly effective nematocides. Typical species of these preferred compounds are:

2-chloro-4-bromophenyl methanesulfonate
2-bromo-4-chlorophenyl methanesulfonate
2-iodo-4-chlorophenyl methanesulfonate
2-iodo-4-fluorophenyl methanesulfonate
2-chloro-4-iodophenyl methanesulfonate
2-chloro-4-fluorophenyl methanesulfonate
2-bromo-4-iodophenyl methanesulfonate
2-fluoro-4-bromophenyl methanesulfonate
2-fluoro-4-chlorophenyl methanesulfonate The highest nematocidal activity is shown by those methanesulfonates wherein each X and $X_1$ is different and is either chlorine, bromine or fluorine.

The mixed halophenylsulfonates of the invention are readily prepared by the reaction of the appropriate 2,4-dihalophenol with the appropriate alkanesulfonyl chloride in the presence of an acid acceptor such as pyridine. Other acid acceptors such as aqueous solutions of sodium hydroxide, potassium hydroxide, or other suitable bases may be employed.

Suitable phenol reactants include 4-bromo-2-chlorophenol, 2-bromo-4-chlorophenol, 4-bromo-2-fluorophenol, 4-iodo-2-chlorophenol, 4-fluoro-2-chlorophenol and the like. Many of these mixed dihalophenols are commercially available, others may be readily prepared according to known methods of the art, given by J. Am. Chem. Soc. 81 94 (1959), for example. Appropriate alkanesulfonyl chlorides include methanesulfonyl chloride, ethanesulfonyl chloride or other lower alkanesulfonyl chlorides.

Because of its ready availability, methanesulfonyl chloride is preferred.

The reaction is carried out in liquid phase at temperatures in the range of 10° C. to 50° C. Most conveniently the reaction is conducted at room temperature—that is at temperatures of 20° C. to 30° C. In general the reaction is most conveniently conducted at atmospheric pressure. Pressure conditions are not considered to be critical and if necessary superatmospheric or subatmospheric conditions may be employed.

The reaction of the 2,4-mixed dihalophenol and alkanesulfonyl chloride is carried out in the presence of a solvent. Suitable solvents include ether, ethanol, methanol, pyridine and water.

The reaction of the mixed dihalophenol and the alkanesulfonyl chloride is generally complete in 30 minutes to two hours. In certain instances it may be advantageous to conduct the process over shorter reaction times such as 10 to 15 minutes or even to employ longer reaction times—say four hours.

The reaction product in some instances is a solid and in other instances is liquid. It is conveniently separated from the reaction mixture in good yield by conventional methods of separation known to the art.

The invention should not be regarded as limited by the following examples. Parts given in the preparative examples are parts by weight unless otherwise noted, and parts by weight bear the same relation to parts by volume as does the kilogram to the liter.

*Example I.—Preparation of 2-chloro-4-bromophenyl methanesulfonate*

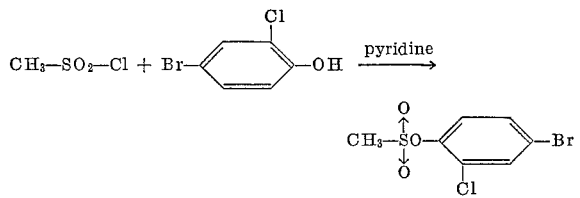

To a solution of 20.8 parts (0.1 mole) of 4-bromo-2-chlorophenol in 50 parts by volume of pyridine there was added 11.5 parts (0.1 mole) of methanesulfonyl chloride. A precipitate formed rapidly and after standing two hours at room temperature the mixture was poured into 1000 parts by volume of water. The oil which separated crystallized on standing and was recrystallized from hexane to give colorless crystals; M.P. 73–74° C.; yield, 23 parts or 81% of theory. Structure was confirmed by infra-red and elemental analysis.

*Elemental Analysis.*—Calculated for $SO_3BrClC_7H_6$: Cl, 12.4%; Br, 28.0%; acid elem., g./equiv. 71.4. Found: Cl, 12.3%; Br, 28.2%; acid elem. g./equiv. 73.4.

*Example II.—Preparation of 2-bromo-4-chlorophenyl methanesulfonate*

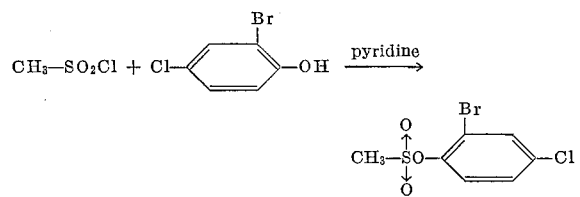

To a solution of 20.8 parts (0.1 mole) of 2-bromo-4-chlorophenol in 50 parts by volume of pyridine there was added 11.5 parts (0.1 mole) of methanesulfonyl chloride. There was a rapid formation of precipitate and after two hours at room temperature the reaction mixture was poured into 1000 parts by volume of water. The precipitated oil crystallized and was recrystallized from hexane to yield colorless crystals; M.P. 58–59° C. The yield 23 parts or 81% of theory. The structure was confirmed by infrared and elemental analysis (percent by weight).

*Elemental Analysis.*—Calculated for $SO_3BrClC_7H_6$: Cl, 12.4%; Br, 28.0%; S, 11.2%; acid elem., g./equiv. 71.4%. Found: Cl, 12.4%; Br, 27.2%; S, 11.4%; acid elem., g./equiv. 72.4%.

*Example III.—Preparation of 2-fluoro-4-bromophenyl methanesulfonate*

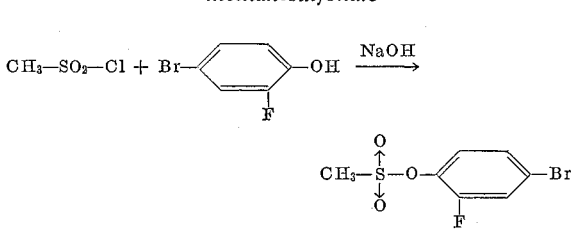

11.5 parts (0.06 mole) of 4-bromo-2-fluorophenol and 8 parts (0.07 mole) of methanesulfonyl chloride was dissolved in 30 parts by volume of ether and cooled to 10° C. An aqueous solution of sodium hydroxide (28 parts of 10% solution; 0.07 mole) was added slowly with stirring and the reaction mixture then was warmed to 30° C. for 30 minutes. The ether layer was separated, the aqueous layer extracted three times with 100 parts by volume of ether and the ether solutions combined. The ether solution was dried, stripped and the residue distilled at 115–120° C. (0.3 mm.) to yield 12 parts (75% of theory) of colorless liquid. The structure was confirmed by elemental analysis (percent by weight).

Calculated for $SO_3BrFC_7H_6$: Br, 29.8%; acid elem., g./equiv., 57.2%. Found: Br, 31.0%; acid elem., g./equiv., 70.3%.

*Example IV.—Preparation of 2-fluoro-4-chlorophenyl methanesulfonate*

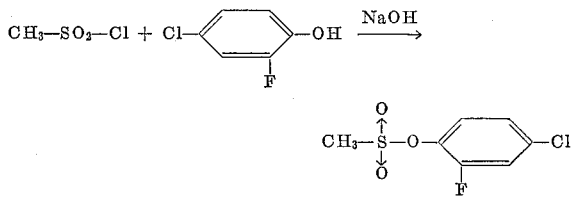

7.3 parts (0.05 mole) of 4-chloro-2-fluorophenol and 8 parts (0.07 mole) of methanesulfonyl chloride was dissolved in 30 parts by volume of ether and cooled to 0° C. Aqueous sodium hydroxide (24 parts of 10% solution; 0.06 mole) was added slowly with stirring during 10 minutes (cooling was necessary). The mixture warmed to 20° C. and 70 parts by volume of benzene was added. The organic phase was separated, dried and distilled. The product distilled at 113–118° C. (0.3–0.7 mm.) to yield 8.1 parts (73% of theory) of colorless liquid. The structure was confirmed by elemental analysis (percent by weight).

Calculated for $SO_3ClFC_7H_6$: Cl, 15.8%; acid elem., g./equiv., 56.2%. Found: 15.8%; acid elem., g./equiv., 58.2%.

*Example V.—Nematode control by seed treatment*

Approximately 25 to 30 tomato seeds were soaked in 1000 parts per million of the test compound in water for 24 hours. The seeds were then filtered off from the test solution, washed several times with clear water and then planted in root-knot nematode infested soil. After approximately six weeks, the plants were removed from the soil, their roots washed in running water and the roots were examined for root-knot nodules. Table I lists the degree of control obtained by representative compounds of the invention.

TABLE I

*Nematode control by seed treatment*

| Control: | Percent control 1000 p.p.m. |
|---|---|
| 2-chloro-4-bromophenyl methanesulfonate | 100 |
| 2-bromo-4-chlorophenyl methanesulfonate | 100 |
| 2-fluoro-4-bromophenyl methanesulfonate | 96 |
| 2-fluoro-4-chlorophenyl methanesulfonate | 98 |
| 2-iodo-4-chlorophenyl methanesulfonate | 45 |
| 2-chloro-4-bromophenyl chloromethanesulfonate | 75 |

The mixed halophenyl sulfonates of the invention have also been found to be highly effective when impregnated onto inert seed coating solid carriers and the coated seeds were planted in nematode infested soil.

*Example VI.—Nematode control by soil treatment*

The compounds of the invention were thoroughly mixed with soil infested with the root-knot nematode, *Meloidogyne incognita* (*Var. acrita*). All tests were made in replicates. In addition two-quart jars of untreated soil served as controls. The samples of soil were held at 80° F. for four weeks, then were transferred to 4-inch plant pots and seeded with tomatoes. Tomatoes are excellent indicator plants for evaluation of the presence of root-knot nematodes in the soil. After four weeks, the soil was washed from the roots of the plants and the number of root-knot galls, as evidence of the feeding of nematodes, was visually ascertained by experienced observers. The dosages used and the control of nematodes obtained at each dosage of each of the test compounds are set out in Table II.

TABLE II

[Control of root-knot nematodes]

| Compound | Dosage, gms/qt. | Control, percent |
|---|---|---|
| 2-chloro-4-bromophenyl methanesulfonate | 0.001 | 100 |
| 2-bromo-4-chlorophenyl methanesulfonate | 0.001 | 100 |
| 2-fluoro-4-bromophenyl methanesulfonate | 0.002 | 96 |
| 2-iodo-4-chlorophenyl methanesulfonate | 0.01 | 88 |
| 2-fluoro-4-chlorophenyl methanesulfonate | 0.001 | 85 |
| 2-bromo-4-fluorophenyl methanesulfonate | 0.01 | 100 |
| 2-chloro-4-bromophenyl chloromethanesulfonate | 0.001 | 100 |

*Example VII.—Bare root dip test*

Aqueous solutions or suspensions of 200, 400 and 800 p.p.m. of the active compound were prepared. The roots of tomato plants heavily infected with root-knot nematodes were immersed in solutions for 24 hours, after which the plants were removed and planted in sterile soil. Four to six weeks later, the plants were removed and the new growth was inspected and observations made for root-knot infection. The degree of control obtained is summarized in Table III.

TABLE III

[Nematode control by root dip]

| Compound | Conc., p.p.m. | Control, percent |
|---|---|---|
| 2-chloro-4-bromophenyl methanesulfonate | 200 | 82 |
| Do | 400 | 96 |
| Do | 800 | 100 |
| 2-bromo-4-chlorophenyl methanesulfonate | 200 | 50 |
| Do | 400 | 82 |
| Do | 800 | 96 |
| 2-fluro-4-chlorophenyl methanesulfonate | 200 | 96 |

It is apparent that this new class of mixed 2,4-dihalophenyl sulfonates exhibits excellent properties for the control of root parasitic nematodes. These compounds are residual in the soil—that is, they are not excessively volatile, nor do they rapidly leach through the soil, nor do they decompose readily. While these compounds are toxic to noxious nematodes, they do not appear to adversely affect growing plants and seed germination. This property permits the application of these compounds to the soil prior to planting, at planting, or to the soil adjacent to the growing plant.

Thus the 2,4-dihalophenyl sulfonates of the invention have been found to be effective killers of soil-dwelling nematodes—that is the unsegmented roundworms of the class Nematoda, also known as eelworms, which customarily inhabit soil and feed upon the roots of plants growing therein. These mixed dihalophenyl sulfonates are particularly effective against the important economic root-knot nematodes of the genus, Meloidogyne.

These sulfonates are employed for the destruction of nematodes in soil by disseminating the sulfonates in the nematode-infested soil, to provide the necessary concentration of the sulfonates in the soil. Judging by the experimental work which has been performed, the nematodically effective concentrations of these sulfonates in the soil lie within the range of from about 1 to about 100 parts per million, on a weight basis based on the weight of the air-dry soil, with the usual dosage ranging from about 4 to about 20 parts per million, on the same basis. As a practical matter, the effective dosage generally amounts to from about 1 to about 50 pounds of the nematocide per acre of land, depending upon the depth of soil to be treated, which may be up to 6, or 8, or even 12 inches, depending upon the particular species of plants and nematodes involved. Generally, dosages of from about 2 to about 40 pounds of the nematocide per acre of land are preferred.

The sulfonates of the invention may be dissolved in a suitable liquid diluent and the solution applied to and mixed with the soil, or the sulfonates may be formulated with a suitable solid carrier and applied as a dust, powder or as granules to the soil and admixed therewith. By the use of suitable emulsifying and dispersing agents the sulfonates can be emulsified or dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally but a small concentration of the emulsifying agent is required, as little at 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be to advantage to dissolve the sulfonate or sulfonates to be used in a solvent which can readily be dispersed in water to produce a heterogeneous dispersion of the nematocide in the water.

Where the sulfonate nematocide is to be applied as a solution, suitable solvents include alcohols, ketones and hydrocarbons, such as, for example, isopropyl alcohol, benzene, acetone, ordinarily used in disseminating agricultural chemicals, including spray oils, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomeaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

The solid formulations can be prepared by dissolving the nematocide in a suitable solvent, such as a volatile solvent, impregnating and/or coating the carrier particles with the solution and if necessary, removing the solvent. Granular formulations can be prepared by impregnating and/or coating granules of the carrier with the nematocide or by forming granules of mixtures of the nematocide and carrier.

From the standpoint of mechanics, the nematocide, neat or as a formulation, is applied to the soil in any manner which enables its intimate admixture with the soil to be treated. Thus the nematocide, which includes formulations thereof, can be applied to the surface of the soil, or it can be applied below the surface of the soil, and then admixed with the soil. If in the form of a liquid formulation, the nematocide can be drenched onto the surface of the soil or injected into the soil. In other words, conventional means, well known in the art, can be used to effect intimate admixture of the nematocide with the soil to be treated.

The 2,4-dihalophenyl sulfonates are characterized by a very extended effective life in the soil and essentially no phytotoxicity at the nematocidally effective dosages. Consequently, it may not in all cases be necessary to treat the entire mass of nematode-infested soil—in some cases it may be sufficient to treat only the soil of the rhizosphere of the plants to be protected. Thus, the soil immediately surrounding the roots of established trees can be treated to protect the trees, and row crops can be protected by treating only the soil which will surround the roots of the plants before the seeds or plants are planted, or after the plants have been planted. The formulations of the nematocides can also contain other materials, such as insecticides, fungicides, nematocides of different action and/or different physical characteristics, hormones, and/or fertilizers, to form multipurpose compositions.

The 2,4-dihalophenyl sulfonates may be applied to seeds by soaking the seeds in solutions, suspensions, or dispersions of the active compound in water. It is essential that the sulfonate be brought into intimate contact with the seeds. The compound may be used in solid or in slurry form as well. The compound may be impregnated onto an inert carrier commonly employed in the seed treating art—pulverized carbon, mineral or botanical carriers—and then the seed is coated prior to planting. The seed may be treated as well in conjunction with the planting operation. When the seed is coated by liquid or slurry application such seed coaters as methylcellulose, ethylcellulose or other common coaters may be employed with the compound of the invention. As well, the seed treatment may contain a fungicide, insecticide or fertilizer.

In addition transplanting stock may be dipped into solutions, suspensions, or dusts containing the nematocidally active sulfonate of the invention to protect the plants from nematode attack. Such a treatment can be applied to control nematodes on infected roots or be applied to protect the plants from the infectious nematodes in the soil. Such transplanting treatments may contain insecticides, fungicides or other plant promotant chemicals.

We claim as our invention:

1. A compound of the formula:

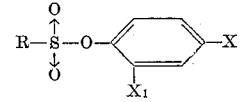

wherein each X and $X_1$ is a different halogen and R is a member of the group consisting of alkyl, monochloroalkyl and monobromoalkyl of one to four carbon atoms.

2. A compound of the formula:

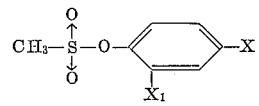

wherein each X and $X_1$ is a different halogen.

3. A compound of the formula:

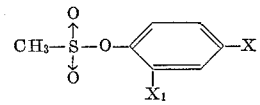

wherein each X and $X_1$ is different and is selected from the group consisting of chlorine and bromine.

4. 2-bromo-4-chlorophenyl methanesulfonate.
5. 2-chloro-4-bromophenyl methanesulfonate.
6. 2-fluoro-4-bromophenyl methanesulfonate.
7. 2-fluoro-4-chlorophenyl methanesulfonate.

References Cited

UNITED STATES PATENTS

| | | | |
|---|---|---|---|
| 2,474,350 | 6/1949 | Eilerman | 260—456 X |
| 2,728,788 | 12/1955 | Waldron et al. | 260—456 |
| 2,782,217 | 2/1957 | Dazzi | 260—456 |
| 2,894,971 | 7/1959 | O'Rear et al. | 260—456 |
| 2,918,401 | 12/1959 | Copp | 167—30 |
| 3,021,258 | 2/1962 | Haynes | 167—30 |

OTHER REFERENCES

Beilstein, "Handbuch der Organischen Chemie," volume 6, page 201 (1923).

Vol'fson et al., C. A., vol. 51, page 1825d (1957).

CHARLES B. PARKER, *Primary Examiner.*

F. HIGEL, *Assistant Examiner.*